(12) United States Patent
Navarro

(10) Patent No.: US 10,428,786 B2
(45) Date of Patent: Oct. 1, 2019

(54) HYDROELECTRIC TURBINE SYSTEM

(71) Applicant: Richard M. Navarro, Grapevine, TX (US)

(72) Inventor: Richard M. Navarro, Grapevine, TX (US)

(*) Notice: Subject to any disclaimer, the term of this patent is extended or adjusted under 35 U.S.C. 154(b) by 0 days.

(21) Appl. No.: 15/722,362

(22) Filed: Oct. 2, 2017

(65) Prior Publication Data

US 2019/0101095 A1    Apr. 4, 2019

Related U.S. Application Data

(60) Provisional application No. 62/433,380, filed on Dec. 13, 2016, provisional application No. 62/554,674, filed on Sep. 6, 2017.

(51) Int. Cl.
*F01D 15/10* (2006.01)
*F02C 6/00* (2006.01)
(Continued)

(52) U.S. Cl.
CPC ............ *F03B 13/086* (2013.01); *F03B 13/00* (2013.01); *F03B 17/005* (2013.01); *F03B 17/04* (2013.01);
(Continued)

(58) Field of Classification Search
CPC ...... F03B 13/086; F03B 17/04; F03B 17/005; F03B 13/00; F05B 2260/406;
(Continued)

(56) References Cited

U.S. PATENT DOCUMENTS 1,436,933 A    11/1922  Banki
1,796,618 A *   3/1931  Petersen ............. F03B 13/1815
                                                417/330
(Continued)

FOREIGN PATENT DOCUMENTS

GB         2454167 A  *  5/2009  ............ F03B 13/183
WO    WO 2014/113826     7/2014

OTHER PUBLICATIONS

Calvert, J.B.,"The Siphon (http://mysite.du.edu/~jcalvert/tech/fluids/hydstat.htm#Siph)", 2000.
(Continued)

*Primary Examiner* — Tulsidas C Patel
*Assistant Examiner* — Thomas K Quigley
(74) *Attorney, Agent, or Firm* — Brian K. Yast; Geoffery A. Mantooth

(57) ABSTRACT

The active water hydroelectric system uses a hydraulic ram pump to increase pressure to turbine blades using water from a low head water source, the system comprising a housing, drive pipe, delivery pipe, pressure vessel, turbine, waterwheel, and first and second generators. The drive pipe is fluidly coupled to the low head water source and pressure vessel. A primary flow moves across a turbine turning a first generator. Primary and secondary flows turn the waterwheel which turns the second generator. The passive hydroelectric system a floatation device such as a ship or barge. A vertical siphon pipe and vector siphon pipe comprise a siphon mechanism that delivers water to the hydraulic ram pump. A primary flow of water flows from the pump to a drive pipe to the turbine. Primary and secondary flows of water turn the waterwheel. Water exits through an exit pipe.

5 Claims, 3 Drawing Sheets

(51) Int. Cl.
F03B 13/08 (2006.01)
F03B 13/00 (2006.01)
F03B 17/00 (2006.01)
F03B 17/04 (2006.01)

(52) U.S. Cl.
CPC ..... F05B 2240/93 (2013.01); F05B 2260/406 (2013.01); F05B 2260/42 (2013.01)

(58) Field of Classification Search
CPC .. F05B 2260/42; F05B 2240/13; Y02E 10/38; Y02E 10/22; Y02E 10/223; Y02E 10/20; Y02E 10/28; Y02E 10/226; Y02E 10/72; Y02E 60/17
USPC ................................... 415/60; 417/148, 330
See application file for complete search history.

(56) References Cited

U.S. PATENT DOCUMENTS

| | | | | |
|---|---|---|---|---|
| 2,662,726 | A * | 12/1953 | Thomas | F03B 17/00 415/1 |
| 2,887,956 | A * | 5/1959 | Kunkel | F04F 7/02 417/148 |
| 3,810,717 | A * | 5/1974 | Rakcevic | F03B 13/06 290/52 |
| 3,923,417 | A * | 12/1975 | Swiecicki | F03B 3/02 415/1 |
| 4,132,901 | A * | 1/1979 | Crausbay | E02B 9/00 290/42 |
| 4,220,003 | A * | 9/1980 | Doi | F03B 17/025 185/27 |
| 4,258,269 | A * | 3/1981 | Tsubota | F03B 13/22 290/42 |
| 4,514,977 | A * | 5/1985 | Bowen | F04F 3/00 417/148 |
| 4,622,471 | A * | 11/1986 | Schroeder | F03B 13/145 290/42 |
| 6,359,347 | B1 * | 3/2002 | Wolf | F03B 13/086 290/43 |
| 6,420,794 | B1 * | 7/2002 | Cao | F03B 17/005 290/43 |
| 7,355,298 | B2 * | 4/2008 | Cook | F03B 13/148 290/53 |
| 7,377,492 | B2 * | 5/2008 | Vrana | B01D 19/0042 261/29 |
| 7,843,099 | B2 * | 11/2010 | Fielder | F01D 15/10 290/54 |
| 8,424,300 | B1 | 4/2013 | Navarro | |
| 8,643,206 | B2 * | 2/2014 | Ekern | F03B 13/06 290/52 |
| 9,080,555 | B2 | 7/2015 | Farb et al. | |
| 2003/0066289 | A1 * | 4/2003 | Watten | F03B 13/00 60/398 |
| 2009/0007557 | A1 * | 1/2009 | Farley | F03B 13/148 60/398 |
| 2009/0152871 | A1 * | 6/2009 | Ching | F03B 1/00 290/54 |
| 2010/0209192 | A1 * | 8/2010 | Behm | E02B 9/06 405/87 |
| 2011/0042956 | A1 * | 2/2011 | Frye | F03B 17/00 290/54 |
| 2012/0187686 | A1 * | 7/2012 | Walton | F03B 1/00 290/52 |
| 2012/0187687 | A1 * | 7/2012 | Walton | F03B 1/00 290/52 |
| 2012/0187690 | A1 * | 7/2012 | Walton | F03B 7/00 290/54 |
| 2013/0088015 | A1 * | 4/2013 | Walton | F03B 1/00 290/54 |
| 2013/0089410 | A1 * | 4/2013 | Azar | F03B 13/06 415/151 |
| 2013/0205767 | A1 * | 8/2013 | Shinde | E02B 9/00 60/495 |
| 2014/0028028 | A1 * | 1/2014 | Frye | F03B 13/10 290/54 |
| 2014/0193201 | A1 | 7/2014 | Stauffer | |
| 2015/0113968 | A1 * | 4/2015 | Christensen | F01K 27/005 60/325 |

OTHER PUBLICATIONS

Gribbin, J.E., Introduction to Hydraulics and Hydrology with Applications for Stormwater Management. 3rd Ed. Thomsen Press. 2007.
Sampath, S.S., Shetty, S., Pendanathu, A.M. Javaid, W, Chithirai, P.S.M. Estimation of Power and Efficiency of Hydraulic Ram Pump with Recirculation System. (2015) International Journal of Computer-aided design and Implementation. 1:1. 9-24.
Shende, P. B., Choudhary, S.K., Ninawe, A. P. Design and Analytical Calculation for a Hydram using Individual Head Losses. (2015). International Journal of Science Technology and Engineering. 2:02. Aug. 2015. 107-111.
Zayas, J., Hydropower Vision. (2016). A New Chapter for America's 1st Renewable Electricity Source. U.S. Department of Energy. Chapter 1. i-69.
Zayas, J., Hydropower Vision. (2016). A New Chapter for America's 1st Renewable Electricity Source. U.S. Department of Energy. Chapter 2. 70-227.
Zayas, J., Hydropower Vision. (2016). A New Chapter for America's 1st Renewable Electricity Source. U.S. Department of Energy. Chapter 3. 228-347.
Zayas, J., Hydropower Vision. (2016). A New Chapter for America's 1st Renewable Electricity Source. U.S. Department of Energy. Chapter 4. 348-398.
Wikipedia. Siphon. (2017). http://en.wikipedia.org/wiki/Siphon.

* cited by examiner

HYDROELECTRIC TURBINE SYSTEM

This application claims the benefit of provisional application Ser. No. 62/433,380 filed Dec. 13, 2016, and provisional application Ser. No. 62/554,674 filed Sep. 6, 2017 the contents of which are incorporated by reference herein in their entirety.

FIELD OF THE INVENTION

This disclosure relates generally to a hydroelectric turbine system and specifically to a hydroelectric turbine system comprising a hydraulic ram, the system being adapted for use in both passive and active water environments.

BACKGROUND OF THE INVENTION

Hydroelectric power is the most cost efficient form of renewable energy and is considered a mature industry as there have been few innovations in many years. Hydraulic rams ("hydrams") have been used for hundreds of years to pump water without an external source of energy. The principles of hydraulic rams will be used to amplify the source head thereby improving the energy output of the turbine through increased rotational speed. Instead of pumping the water vertically with the hydram, the pumped water will be injected into a hydroelectric turbine to rotate the turbine with greater speed than would be expected with many natural flows of water. An innovative pitch back water wheel is added to the hydraulic ram system to transfer energy from hydram waste water to drive a second generator.

In one aspect of the current invention, the system is adapted for use on low head active water flows such as low-head dams or streams with short-drop waterfalls. In this aspect, the system generally comprises an improved hydram and one or more hydroelectric turbines. In a preferred embodiment, water from a low head water source travels downward through a drive pipe leading to a chamber comprising a impulse valves and delivery valves operating antagonistically. Drive pipe water flow creates kinetic energy such that water pressure increases within the chamber thereby causing the impulse valve to close. The sudden stoppage of the water induces a reverse transmission of the kinetic energy causing a portion of the water to open the delivery valve and pass into a pressure vessel connected to a vertical or upwardly sloped delivery pipe. Exiting water from the impulse valve and delivery pipe moves over a water wheel and/or turbine causing the wheel/turbine to turn and generate electric power.

In another aspect of the current invention, the system is adapted for use on a passive water source such as a pond, lake, stream, or ocean. In the passive water source aspect of the current invention, the system uses a constant energy source, i.e., gravity, to produce electricity as needed. The system of this aspect does not require batteries, poses no environmental harm or threat to marine life and may be built and operated close to shore to in order to reduce construction, operating, maintenance, and grid connection costs. The system uses an improved siphon arrangement to lift water from a passive water source, such as a pond, to power a hydroelectric turbine. The lifted water is accelerated and delivered via one or more pipes to an improved hydram and/or a turbine. The presence of multiple pipes results in the cumulative increase of the vertical head of the water delivering kinetic energy to the turbine.

DESCRIPTION OF THE PRIOR ART

Typically, hydroelectric power is produced when water is dropped from a source (e.g. a dam or water fall) to a turbine thereby rotating a rotor within a stator to produce electricity. Hydroelectric power plants often require the construction of a dam and the flooding of land to provide sufficient power source. This is costly and may result in the destruction of habitat, cultural artifacts, and the relocation of people. Traditional hydroelectric is also limited to areas where there is a source of flowing water and is subject to seasonal fluctuations due to evaporation and reduced rainfall. Many dams are not tall enough to provide sufficient drop for current technology and are therefore considered "non-powered" dams.

Conventional ocean energy platforms use wave energy, tidal energy or temperature inversions to produce electricity. These platforms depend on an energy form that is not reliable as wave and tidal energy vary from hour to hour. Temperature inversion platforms have been researched for over 20 years and are still not cost effective.

The major problem with ocean energy devices is that they depend on natural phenomena that are not consistent. Consequently, electricity produced by such conventional means must be stored for use when needed. For example, wave energy may be huge one day and virtually non-existent the next day. Therefore, utility companies must store the produced electricity in batteries, have a conventional energy power plant on back up duty, or must neutralize the power during peak production periods to avoid damage to the utility grid infrastructure. Further current ocean energy technology must be built far off-shore to take advantage of maximum wave movement thereby increasing the cost of construction, maintenance, and connection to the electrical grid.

Traditional hydroelectric energy production has a long successful history and many hydroelectric turbines have been developed to improve efficiency and diversify where electricity may be produced under different conditions. Approximately 48% of all U.S. renewable energy is produced with hydroelectric but this represents about 7% of the total energy mix. Among the limitations of traditional hydroelectric is the fact that energy production is limited with low-head dams 25 feet or less. The U.S. Department of Energy (2016) predicts that the amount of energy produced from water could be increased about 50 gigawatts if more efficient turbines could produce electricity at low-head dams as there are over 87,000 such dams in the U.S. There have been no new hydroelectric power plants in the U.S. in over 30 years and most of the new hydroelectric projects in this time period have focused on retrofitting existing power plants or the use of pumped storage where water is mechanically pumped upwards to a reservoir during periods of low energy use and allowed to flow downwards later to drive hydroelectric generators.

Hydraulic ram pumps (hydrams) have been successfully used since the late 1700's to lift water to a higher elevation without the use a mechanical pump. With increased interest in renewable energy that operates without an external energy source, hydraulic rams have been offered as one way to increase the mechanical advantage of falling water to drive hydroelectric turbines. As hydrams have just two moving parts, they are mechanically robust and will continue to operate indefinitely once started.

Shende, Choudhary, and Ninawa (2015) reported that Nwosu and Madueme, and Nganga et. al. discussed the use of a hydram to produce electricity with low-head dams.

Technically, it seems very reasonable that hydrams will increase the head of water to increase electricity production in low-head dams. One major limitation of hydrams, however, is that almost 70% of the water used is lost in the process of pumping the remaining 30% to a higher elevation. Sampath, et. al. (2015) proposed a solution to this weakness by routing the waste water back to the deliver pipe for continuous use of the water; however, this design raises the issue of energy cancellation in the reverse propagation of the kinetic energy from the hammer effect as the pressure wave in water from the impulse valve will be a different phase from the pressure wave in the re-routed water.

In the proposed embodiments, the "waste water" is routed to a pitch back waterwheel to avoid the energy loss inherent in Sampath et. al. design. Certain embodiments of the current design reuse the spent water from the primary hydroelectric turbine is used before the water is returned to the source so all the water is used rather than wasted.

In addition, the previous art limits the use of the hydram to low-head dams or active water applications while the current embodiment applies the technology to passive water by lifting the water to a higher elevation via a siphon. Siphons have been successfully used since 1500 B.C. to transfer liquid from one source to another and are an established practice in many areas of hydraulic technology (Gribbin, 2007). Siphons have two major criteria: 1) the maximum lift is approximately 32 feet at sea level; 2) the point where the water enters the siphon must be higher than the point where the water exits the siphon. When these two criteria are met, siphons will continue to operate virtually indefinitely. It was reported by Calvert (2000) that Pascal demonstrated that siphons work using atmospheric pressure to transfer the water from a higher source to a lower source and that they will work although the fluid in the lower source may be delivered into a greater backpressure force at discharge.

REFERENCES

Calvert 2000. "The Siphon (http://mysite.du.edu/~jcalvert/tech/fluids/hydstat.htm#Siph)")
Gribbin, J. E., Introduction to Hydraulics and Hydrology with Applications for Stormwater Management. $3^{rd}$ Ed. Thomsen Press. 2007.
Sampath, S. S., Shetty, S., Pendanathu, A. M. Javaid, W, Chithiral, P. S. M. Estimation of Power and Efficiency of Hydraulic Ram Pump with Recirculation System. (2015) International Journal of Computer-aided design and Implementation. 1:1. 7-18.
Shende, P. B., Choudhary, S. K., Ninawe, A. P. Design and Analytical Calculation for a Hydram using Individual Head Losses. (2015). International Journal of Science Technology and Engineering. 2:02. August 2015. 107-111.
Wikipedia. Siphon. (2017). http://en.wikipedia.org/wiki/Siphon.
Zayas, J. Hydropower Vision. (2016). A New Chapter for America's $1^{st}$ Renewable Electricity Source. U.S. Department of Energy.

SUMMARY OF THE INVENTION

A device is described that allows the production of electricity using both an active and passive water embodiment.

Active Water Device

In the active water hydroelectric system, the system uses the principles of a hydraulic ram pump ("hydram") to increase the pressure to turbine blades using water from a water source such as low head run-of-the river dam 25 feet of less in height. Generally, the system comprises a housing, drive pipe, impulse valve, delivery valve, pressure vessel, delivery pipe, and a hydroelectric turbine with generator. The drive pipe is fluidly coupled to the low head water source comprising water on one end passing through a stop-valve to control the flow of water from the drive pipe. On the other end, the water is fluidly coupled to the drive impulse valve ("impulse valve") and pressure vessel delivery valve ("delivery valve") located below the pressure vessel to create a hydraulic ram pump (hydram). In the hydram, the impulse and delivery valves serve as logic gates as they alternately start and stop the flow of water to trigger the hammer effect. The active water hydroelectric system uses the reversed kinetic energy of the "water hammer" effect to pump water to an elevation higher than the water source. Pumping efficiency ranges from 60-80% but volumetric efficiency is limited by the ratio of the source head to a discharge head. In a preferred embodiment, the drive pipe is sloped to maximize the acceleration of the water from gravity at the rate of 9.8 m/sec$^2$ and has sufficient length and diameter to provide sufficient water to drive two generators as approximately 30% of the water flow will be directed to the turbine and approximately 70% of the water flow will be directed to rotation of a pitchback waterwheel.

The impulse valve is normally open and allows the water passing through the impulse valve to flow vertically upwards. When the flow of water reaches critical velocity, it creates pressure against this valve that forces it to close. This causes an immediate blockage to the kinetic energy and ceases the flow of water down the drive pipe; thereby causing the kinetic energy from the flow of water to be reversed and equally applied to all components along the entire fluidly coupled system. A far end of the drive pipe is fluidly connected to the delivery valve that is normally closed and is located at the bottom of a pressure vessel. The kinetic energy from the abrupt cessation of the water flow at the impulse valve results in a positive and negative pressure wave to be set up in the water. The negative pressure component results in the brief opening of the delivery valve and the injection of water into the pressure vessel. This cycle repeats itself over and over with alternating opening and closing of the reciprocal valves and the injection of water into the pressure vessel. Approximately 30% of the water flowing down the drive pipe is injected into the pressure vessel so that over multiple cycles, this vessel fills with water and the pressure within the vessel increases as the air within the vessel is compressed. This increases the pressure on the water within the vessel to pressurize it so it can be routed to a delivery pipe that pumps the water to a higher elevation. Increased water pressure results in an increase in the revolutions per minute (rpm) of the blades. The delivery pipe water is fluidly coupled to the turbine blades of a hydroelectric turbine thereby inducing rotation of the blades of the primary turbine which, in turn, induces rotation of a turbine shaft connecting to a stator within the first generator. As the rotors are subsequently rotated within the magnetic field of a first generator, an electrical current is created and allowed to pass through a conductor to the grid, storage (i.e., battery), or be used in an electrical device. In the preferred embodiment, a Francis reaction turbine is used.

After the pressurized water rotates the turbine blades, it exits at the bottom of the primary turbine house via a spent water pipe that directs this flow of water to a second set of blades located in a distal chamber housing a pitchback waterwheel that is operatively connected to a second generator. This flow of water represents the turbine spent water flow that has lost most of its energy in the process of rotating the turbine. Gravity forces it to flow with reduced velocity to the pitchback waterwheel through a downwardly angled pipe from the primary turbine to the pitchback waterwheel. As it flows, the spent water undergoes gravitational acceleration before it is delivered to the upper portion of the pitchback waterwheel where it represents the primary flow of water for the waterwheel.

A secondary flow of water for the pitchback waterwheel comes from the approximately 70% of the water flowing down the drive pipe that is discharged at the impulse valve as it operationally cycles through the hydram operation. Though commonly referred to in hydram literature as the "waste water", in this embodiment, the water is not wasted as it contributes to the operation of the pitchback waterwheel and the consequent generation of electricity from the attached second generator and is designated as "hydram discharged water".

The water from the drive pipe creates a velocity head due to gravitational acceleration of the water from the entrance to the terminus at the drive impulse valve. This accelerated water is discharged upward from the impulse valve and is captured in a hydram discharge water pipe portion of the delivery pipe. The maximum vertical height of this discharge hydram water pipe is determined by the velocity head from the drive pipe. During capture of the discharged water, the water flows upwards into the hydram discharge water pipe which has a vertical height at a higher elevation than its delivery point at the pitchback waterwheel. As it downwardly passes through this pipe, it undergoes gravitational acceleration. The water from this discharge pipe is delivered to the pitchback water wheel at the bottom of the waterwheel to induce rotation of the wheel.

The pitchback waterwheel comprises a housing, waterwheel, shaft, electrical generator, primary and secondary separate water sources, weir, Venturi valve, and a negative pressure to facilitate lift of the blades. The purpose of the pitchback waterwheel is to use water that was formerly wasted in other designs as efficiently as possible to produce electricity.

The pitchback wheel of the preferred embodiment of the active water hydroelectric system comprises a plurality of curved blades. The waterwheel is located within the housing such that the secondary flow from the discharge hydram water pipe flows along the bottom of the wheel to initiate rotation. This represents approximately 70% of the water delivered from the drive pipe to the hydram. In one embodiment of the active water hydroelectric system, there are four blades. However, a greater or lesser number of blades may be used. The curvature of each blade of one embodiment is such that the arc is greater at a distal end than an end closest to a water wheel horizontal shaft.

Above the waterwheel the primary flow from the turbine spent water pipe enters the top of the housing. After entering the housing, the water encounters a weir positioned on the floor of the pipe just before an opening on the floor of the pipe leading to the pitchback wheel. The weir serves two purposes 1) to increase the velocity of the portion of the water flowing to the pitchback waterwheel; and 2) to increase the pressure on the water prior to a Venturi constriction. The Venturi constriction is located just past the opening on the floor of the pipe leading to the waterwheel and it reduces the lumen of the pipe such that the portion of the water flow that does not pass to the waterwheel passes through the constriction at increased pressure. The water forced through the Venturi valve is increased in velocity and is dropped down a separate channel on the backside of the waterwheel. Along the backside channel wall one-third of the way vertically downward from the top of the waterwheel, an elevation is created on the housing wall proximal to the waterwheel such that the elevation is closed at the top and open at the bottom to cause the water to pass by the opening but not to enter it. As the water from the Venturi passes downwardly over this elevation, it creates a negative pressure in the open end of the elevation. This negative pressure assists in the lift on the backside of the waterwheel thereby facilitating the rotation of the water wheel via the Bernoulli effect.

Approximately half of the water from the turbine spent water pipe is diverted down an opening in the floor of the pipe directly to the waterwheel blades located below. This water strikes the front-side of the blades of the waterwheel between one-half and two-thirds of the distance from the center point of the wheel to the free end and induces rotation of the blade due to gravity, velocity, and mass of the water. The length of the pipes, downward slope, and associated frictional forces will determine the increased acceleration via gravity of the water as it passes to the pitchback wheel. The primary and secondary water flows are merged below the waterwheel to create a tertiary flow that is discharged back to the original source by downward angling the exit pipe from the pitchback waterwheel to return the water to the source. This water is the sum of all the water delivered from the water source. The pitch back wheel may be fabricated from high tensile plastic to sustain the pressures developed during rotation and resist corrosion.

Accordingly, the three forces contributing to rotation of the waterwheel blades result in rotation of the pitchback wheel connected to the waterwheel horizontal shaft that connects to the rotors of the generator. As the rotors are rotated within the magnetic field created by the stators of the generator, an electrical current is induced that may be routed to the electrical grid, storage device, or used in an electrical device.

It is proposed that the full-scale version of the active water hydroelectric system will be located near the base of a low-head dam (25 feet or less) and may allow several active water hydroelectric systems to be placed horizontally across the water flow from the dam to drive multiple systems without occluding the entire width of the flow.

Passive Water System

In the preferred embodiment of the passive hydroelectric system, the system comprises one or more active hydroelectric systems housed on a floatation device such as a ship or barge. In this embodiment, however, a vertical siphon pipe and vector siphon pipe comprise a siphon mechanism to serve as the water source rather than flowing water from a low-head dam used in the active water system. In the preferred embodiment, a plurality of siphon mechanisms, hydrams, and hydroelectric turbines with associated housing are all located on a barge or ship. Assuming there is sufficient water from a given source, the plurality of siphon mechanisms allows for adjusting the amount of water being delivered to a given turbine. Within a hydroelectric system, the amount of electricity produced is the result of the inter-active action of the total head and the total amount of water delivered to the turbine.

The operation of this device allows for a variety of alternative embodiments. In one such embodiment, the passive water system could be located on shore with the siphon mechanism drawing and returning the water to the source.

The vertical siphon pipe and vector siphon drive pipe are hollow tubular members and comprise a siphon mechanism to lift the water from the passive water source. In a preferred embodiment, each active water system uses eight respective siphon mechanisms for each primary generator. However, a greater or lesser number of siphon mechanisms may be used. The sum of the total number of siphon mechanisms for each individual system contribute to the total amount of water ultimately flowing to the primary turbine. The velocity head from each siphon system is increased by the active water system previously described and used to increase the rotational speed of the turbine.

The vertical siphon pipe of the preferred embodiment has an overall length of 30 feet; however, the total length of the vertical pipes cannot be greater 32 feet which is the maximum height water may be lifted using atmospheric pressure only. The water source, such as the surface of a lake or the ocean, is compressed by atmospheric pressure (e.g., 14.7 pounds per square inch at sea level). An open lower end of each vertical siphon pipe projects into the free water source so that this lower end is continuously below the surface of the water source and is, ideally, covered by a marine filter to restrict marine life from entering the system.

To initiate the flow of water up the siphon mechanism, it is necessary to either create a negative pressure within the system or to prime it with water. A siphon initiator such as a vacuum pump may be used to make the pressure within each vertical siphon and vector siphon drive pipes negative with respect to the water source surface pressure (atmospheric pressure) so the water is pushed up the vertical siphon pipe by atmospheric pressure to approximately 30 feet. At this level, the atmospheric pressure is generally not sufficient to push the water higher. Therefore, the elevated water will succumb to gravity which is the stronger force at 30 feet and cause the water to flow down the vector siphon pipe toward the hydram. As the water passes through the vector siphon pipe it accelerates in concert with gravitational energy and creates a velocity head at the hydram located at the lower end of the vector siphon pipe. Alternatively, a mechanical pump may be used to prime the siphon system with water to initiate flow.

An important consideration is that each vertical siphon pipe's entrance opening is higher than the open lower end of each vector siphon drive pipe to insure continuous flow via the siphon mechanism.

In the active water system, strategic placement of all components will be necessary to ensure that gravity is used to flow the water through all components. Since the hydram elevates the water height, the primary turbine may be located higher than the hydram and the primary turbine must be higher than the pitchback waterwheel which, in turn, must be placed higher than the original water source to flow the water back to the source without a mechanical pump.

Two critical distinctions separate the active and passive water systems. In the active water embodiment, the water source is flowing water from a low head dam versus the passive water embodiment where the water source is a passive water source such as a levee, river, pond, lake, or ocean where the water to drive the hydram is lifted via a siphon system. The passive water system does not use ocean currents, tidal energy or ocean temperature inversions to drive the turbines. Secondly, the active water embodiment may be configured to match the water source. For a larger water source such as the ocean where the water source is virtually infinite, greater watts of power can be produced. For locations with a relatively small source of water (e.g., irrigation pond), fewer watts of electricity power will be produced. In both active and passive water designs, the water is returned without significant environmental implications.

Both active and passive water systems have the advantages of traditional hydroelectric systems; however, the passive water system avoids or lessens the disadvantages such as the need to create a dam or reservoir, fluctuating power output during times of drought, fish kill, or the disruption of land and marine ecosystems.

In some embodiments, the lower opening of the vertical siphon pipe may be coupled to a flexible section to ensure that it is always below the surface of the water yet higher than the lowest opening of the vector drive pipe to insure continuous operation of the siphon mechanism. The turbine may be located higher than the surface of the water source as the hydraulic ram has lifted the water to the turbine. The higher elevation will facilitate the exiting water to flow downward to the secondary turbine and to be re-deposited into the source via the tertiary flow previously described.

DESCRIPTION OF THE PREFERRED EMBODIMENTS

Figure 1:
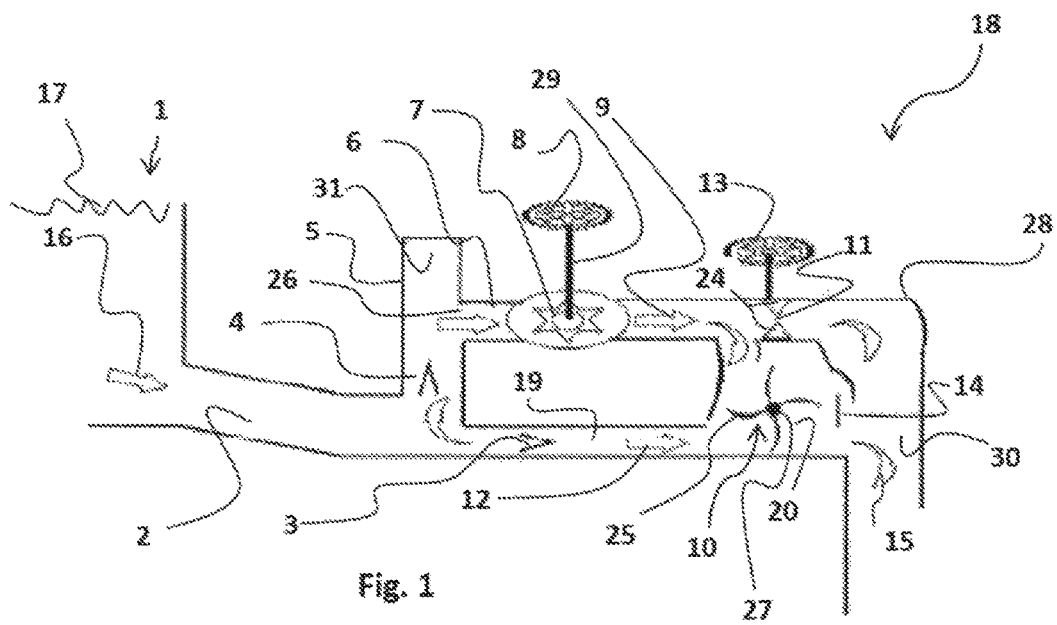
FIG. 1 is a conceptual schematic depiction of the active hydroelectric system in accordance with a preferred embodiment.
Figure 2:
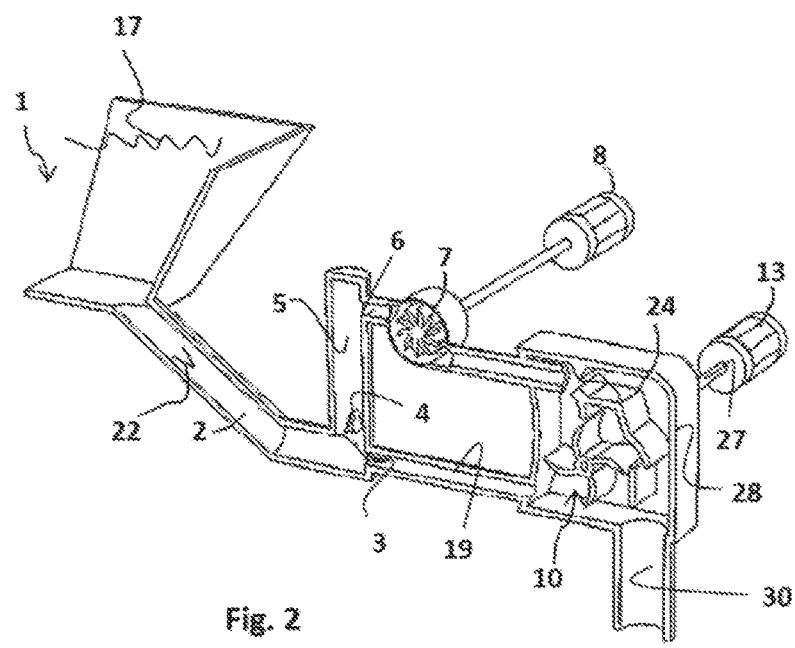
FIG. 2 is a more detailed conceptual schematic depiction of the active hydroelectric system of FIG. 1.
Figure 3:
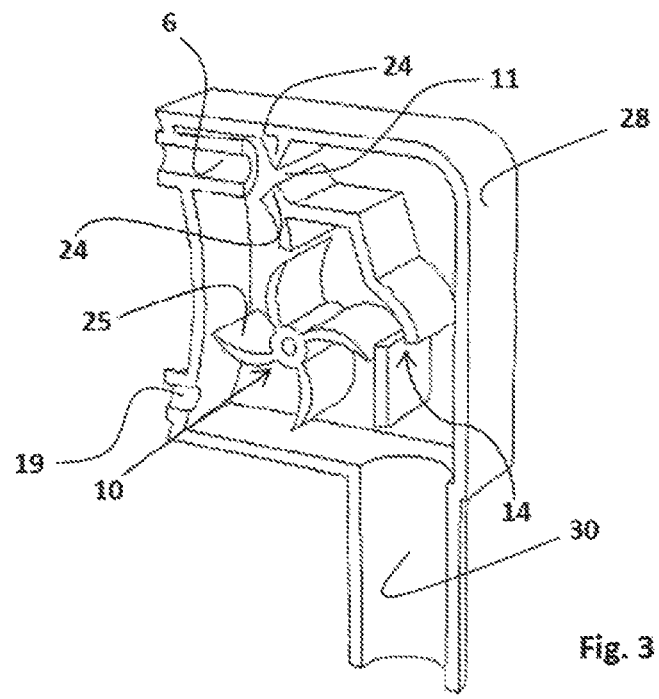
FIG. 3 is a close-up view of the pitch back wheel of the active hydroelectric system of FIGS. 1 & 2.

Embodiments disclosed herein may be useful to provide hydroelectric power that may be generated from both active and passive water sources. The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In describing the embodiments of the invention, specific terminology will be used for the sake of clarity. However, the invention is not intended to be limited to the specific terms so selected, it being understood that each specific term includes all technical equivalents operating in a similar manner to accomplish a similar purpose. It is understood that the drawings are not drawn exactly to scale. In the drawings, similar reference numbers are used for designating similar elements throughout the several drawings.

This specification and appended claims describe particular embodiments of the invention. However, it should be understood, based on this disclosure, that the invention is not limited to the embodiments detailed herein. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, aspects, adaptations, variations, alternatives, and uses of the invention, including what is presently believed to be the best mode of carrying out the invention.

The examples and illustrations of hydroelectric turbine systems 18, 32 are described herein with respect to active and passive water. However, the inventive systems are equally applicable for use in other environments. Moreover, while certain materials are discussed herein with respect to various components of the various embodiments, the embodiments are not limited to such materials. For example, in a preferred embodiment, certain components are formed from plastic or PVC. However, as will be discussed in more detail below, the components of the device may comprise any suitable materials without departing from the scope and spirit of this disclosure.

Active Water System

Referring to FIGS. 1-4, in preferred embodiments of the active water hydroelectric system 18, the system 18 uses the principles of a hydraulic ram pump 46 ("hydram") to increase the pressure to turbine blades using water 16 from a water source 1. This water source 1 may be a low head water source 1 such as a low head dam which is considered to be run-of-the river dam with a vertical drop 25 feet of less from the top of the dam to the bottom.

A First Embodiment of the Active Water Hydroelectric System

FIG. 1 depicts the components of the active water hydroelectric system 18 in accordance with a first embodiment. Generally, the system 18 comprises a housing 28 comprising a drive pipe 2 and a delivery pipe 6. The drive pipe 2 is fluidly coupled to the low head water source 1 comprising water 16. The drive pipe 2 is fluidly connected to a pressure vessel 6 comprising a bolus of air. A delivery valve 4 controls flow of water 16 from the drive pipe 2 to the pressure vessel 5. Water 16 entering the pressure vessel 6 exits the pressure vessel 5 into the delivery pipe 6. Water 16 exiting the pressure vessel 5 forms a primary flow 9. An impulse valve 3 positioned within the drive pipe 2 controls a secondary flow 12 of water 16.

The primary flow 9 of water 16 is elevated with respect to the secondary flow 12 of water 16. The primary flow 9 moves across a turbine 7 which turns a first generator 8. After exiting the turbine 7 a portion of the primary flow 9 falls into a distal chamber 20 housing a pitchback waterwheel 10. The primary flow 9 falls into a tertiary pipe 30 forming a tertiary flow 15 of water 16 exiting the system 18. At the lower end of the drive pipe 2, water 16 passing through the impulse valve 3 where it flows through a discharge water pipe to enter into the bottom of the distal chamber 20. Within the distal chamber 20 the pitchback wheel 10 is operatively connected to a second generator 13. The primary and secondary flows 9, 12 entering the distal chamber 20 run across the pitch back wheel 10 such that the pitch back wheel 10 turns, which, in turn, turns the second generator 13. Water 16 exiting the pitchback wheel 10 from both primary and secondary flows creates enters the tertiary flow 15 to return the water 16 to the source 1.

The delivery pipe 6 of the active water hydroelectric system 18 comprises first and second ends 21, 23. The delivery pipe first end 21 is higher than the delivery pipe second end 23 such that the delivery pipe 6 is downwardly angled so as to facilitate water 16 acceleration via gravity. In a preferred embodiment, the primary flow 9 to the pitch back wheel 10 is relatively linear, it is abruptly split by a weir 24 that re-directs 50% of the primary flow 9 downward to drop onto the pitch back wheel 10 below. The weir 24 causes the momentum of the water 16 to be transferred with increased energy than if it were just falling through a hole thereby providing mass and velocity to rotate the pitchback wheel 10.

The remaining 50% of the primary flow 9 is forced through a Venturi constriction 11. The net effect of the constriction 11 is to increase the pressure behind the constriction 11 thereby increasing the force to the pitch back wheel 10 below, reduce the volumetric flow forward of the constriction 11, and increase the velocity of the primary flow 9 forward of the constriction. The forward flow will be "pressurized". Although this 50% of the primary flow 9 does not directly connect to the pitch back wheel 10, it flows above and past the wheel 10 before dropping vertically to the tertiary flow 15. In the process of dropping downwards, the tertiary flow 15 passes a distal opening 14 near the top of the water wheel housing such that the falling water 16 of the tertiary flow 15 creates a negative pressure on one side of the pitch back wheel 10. This negative pressure (Bernoulli principle) helps to provide additional lift to the pitch back wheel 10.

The pitchback wheel 10 of preferred embodiment of the active water hydroelectric system 18 comprises a plurality of curved blades 25. In one embodiment of the active water hydroelectric system 18, there are four blades 25. However, a greater or lesser number of blades 25 may be used. The curvature of each blade 25 of one embodiment is such that the arc is greater at a distal end than an end closest to a water wheel horizontal shaft 27.

The active water hydroelectric system 18 uses the back pressure of the "water hammer" effect to pump water 16 to an elevation higher than the water source 1. Pumping efficiency ranges from 60-80% but volumetric efficiency is limited by the ratio of the source head 17 to a discharge head 26. The higher the water 16 must be pumped vertically (discharge head 26), the lower the volumetric flow. The source head 17, length of the drive pipe 2, and internal flow characteristics of the pipe 2, 6 (internal diameter, Reynolds number, in-line fittings, slope, etc.), and vertical delivery head 26 all contribute to the volumetric flow.

The secondary flow 12 flows to the pitch back wheel 10 via a secondary flow channel 19 angled downward and below the pitch back wheel 10. The combination of the primary flow 9 and secondary flow 12 increases the total surface area of the pitch back wheel 10 in contact with moving water 16 to double the rotational surface. In effect, the second generator 13 has three sources of energy-primary flow 9 from the top that provides both mass and velocity, secondary flow 12 from the bottom that provides more velocity than mass, and the negative pressure lift on the remaining wheel 10 surface.

The pitch back wheel 10 is attached to a horizontal shaft 27 that spans the housing 28 to drive the second generator 13.

The pitch back wheel 10 may be fabricated from high tensile plastic to sustain the pressures developed during rotation. It is proposed that in the full scale version of the active water hydroelectric system 18 will be located near the base of a low head dam and may allow several active water hydroelectric systems 18 to be placed horizontally across the water flow from the dam to drive multiple generators 8, 13, without occluding the entire width of the flow.

In a preferred embodiment of the active water hydroelectric system 18 the water source 1 comprises 25 feet or less of water head and will have a water source control valve 22 to control the flow of water 16 to the drive pipe 2. In a preferred embodiment, this drive pipe 2 is sloped to maximize the acceleration of the water 16 from gravity at the rate of 9.8 m/sec$^2$ and has sufficient length and diameter to provide sufficient water 16 to drive the two generators 8, 13. Approximately 30% of the water flow will be directed to the turbine 7 and approximately 70% of the water flow will be directed to the secondary flow 12 which contributes to the rotation of the pitch back wheel 10.

Thus, the full flow of water 16 from the drive pipe 2 will pass to the impulse valve 3 which has an approximate 50% duty cycle such that it will allow approximately 70% of the water flow from the drive pipe 2 to pass through the open impulse valve 3 before the impulse valve 3 closes due to the pressure from the flow of water 16. When the impulse valve 3 closes and the water 16 from the drive pipe 2 ceases to flow (stoppage of mass), the kinetic force of the water flow is redirected to the incoming water 16. As water is non-compressible, a reverse positive and negative pressure wave from the kinetic energy of the water is forced through the water flow 16. The negative pressure wave momentarily causes the delivery impulse valve to open as it operates antagonistic to the drive impulse valve. When this happens, approximately 30% of the water 16 is forced into the pressure vessel 5 thereby compressing the air bolus 31 in the pressure vessel as the water rises in the pressure vessel 6. The compressed air bolus 31 within the pressure vessel 5 returns that energy to the water 16 as the delivery valve 4 is opened. This allows a pulse of water 16 to be ejected under force into the delivery pipe 6 thereby directing the pressurized water 16 to the turbine 7. As the back pressure is dissipated by the release of the stored water 16 in the pressure vessel 5. This allows a pulse of water 16 to be ejected under force into the delivery pipe 6 thereby directing the pressurized water 16 to the turbine 7. As the pressure wave of the reversed kinetic energy caused by the closure of the drive impulse valve alternates phase from positive to negative, the drive impulse and delivery impulse valves are antagonistically opened and closed. When the impulse valve 3 re-opens the secondary flow 12 to the pitchback wheel 10 is re-established.

The pressurized water 16 induces rotation of the turbine 7, which, in turn, induces rotation of a turbine shaft 29 connecting a turbine rotor 48 to a stator 49 within the first generator 8. As the rotors 48 are subsequently rotated within the magnetic field of the first generator 8, an electrical current is created and allowed to pass through a conductor to the grid, storage (i.e., battery), or be used in an electrical device. In the preferred embodiment, it is anticipated that a Francis reaction turbine will be used to turn the generator.

The pressurized water 16 loses much of its energy in the process of rotating the turbine 7 and gravity causes it to continue to flow with reduced velocity to the pitch back wheel 10 via a downwardly sloping turbine discharge pipe 70. The length of the discharge pipe 70, the downward slope, and associated frictional forces of the pipe 70 will determine the increased acceleration via gravity of the water 16 as it passes to the pitch back wheel 10. At the end of the turbine discharge pipe 70, the water 16 hits the weir 24 at the bottom of the delivery pipe 6. This weir 24 is positioned on the floor of the turbine discharge pipe 70 just forward to the upper opening to the pitch back wheel 10. The weir 24 serves two purposes: 1) directing a portion of the water 16 flow down to the pitch back water wheel 10; and 2) to constricting the lumen of the delivery pipe 6 so as to create the Venturi constriction 11. The Venturi constriction is constituted by the weir 24 located on the bottom of the delivery pipe 6 and a similar weir 24 located on the top of the delivery pipe 6. The lumen of the pipe is constricted (not totally occluded) such that the remaining portion of the primary flow 9 passes through the constriction 11 at increased pressure.

The portion of the primary flow 9 that passes downwards to the pitch back water wheel 10 possesses both mass and velocity as governed by gravity. This force induces rotation of the pitch back wheel 10 as the blades 25 are rotated in a counter clockwise direction (as viewed from the perspective shown in FIGS. 1-3). Two additional forces are acting on the blades 25. The secondary water flow 12 is a direct linear flow of water 16 which maintains much of the gravitational velocity developed as the water passed downward through the drive pipe 2. The secondary flow 12 is a direct linear flow of hydram discharged water from the drive impulse valve 16 which maintains much of the gravitational velocity developed as the water passed downward through the drive pipe 2. This secondary flow 12 strikes the blades 25 at a lower end of the blades 25 thereby adding additional force to the blades 25 and increasing the rate of rotation.

In addition, the portion of the primary flow 9 that passed through the Venturi constriction 11 has been accelerated via the pressure forcing the water 16 through a smaller opening. This accelerated water 16 passes downward through the tertiary pipe 30 past the drive pipe distal opening 14 adjacent to the pitch back wheel 10. The drive pipe distal opening 14 is covered at the top such that the flow of water 16 from the Venturi constriction 11 passes over the drive pipe distal opening 14 but does not, in any significant amount, enter the opening 14. The downward flow of water 16 creates a negative pressure (Bernoulli principle) within the distal chamber 20. This negative pressure provides a lifting force on the off side of the pitch back wheel blades 25 and contributes to increased rotational speed.

Accordingly, the three forces contributing to rotation of the blades 25 result in rotation of the pitch back wheel 10 connected to the water wheel horizontal shaft 27 that connects to the rotors 48 of the generator 13. As the rotors 48 are rotated within the magnetic field created by the stators 49 of the generator 13, an electrical current is induced that may be routed to the electrical grid, storage device, or used in an electrical device. The primary flow 9 joins with the secondary flow 12 at the bottom of the water wheel 10 and below the drive pipe distal opening 14 to form the tertiary water flow 15. This water 16 is the sum of all the water 16 delivered from the water source 1.

A Second Embodiment of the Active Water Hydroelectric System

Figure 4:
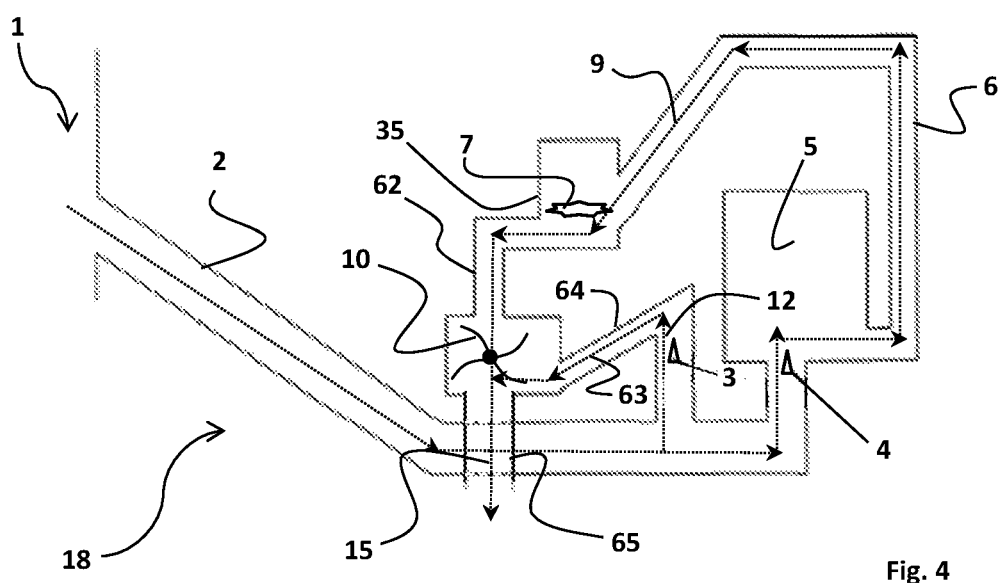
FIG. 4 is a conceptual schematic depiction of the active hydroelectric system in accordance with a preferred embodiment.

Referring to FIG. 4, there is shown the components of the active water hydroelectric system 18 in accordance with a second embodiment. Generally, the system 18 of this embodiment comprises the housing 28, drive pipe 2, impulse valve 3, delivery valve 4, pressure vessel 5, delivery pipe 6, and hydroelectric turbine 7 with first generator 8. The drive pipe 2 is fluidly coupled to the low head water source 1 comprising water 16 on one end passing through a water source control valve 22 to control the flow of water 16 from the drive pipe 2. On the other end, the water 16 is fluidly coupled to the drive impulse valve 3 ('impulse valve') and pressure vessel delivery valve 4 ('delivery valve') located below the pressure vessel 5 to create the hydram 46. In the hydram 46, the impulse and delivery valves 3, 4 serve as logic gates as they alternately start and stop the flow of water 16 to trigger the hammer effect. The active water hydroelectric system 18 uses the reversed kinetic energy of the "water hammer" effect to pump water 16 to an elevation higher than the water source 1. Pumping efficiency ranges from 60-80% but volumetric efficiency is limited by the ratio of the source head 17 to the discharge head 26. In preferred embodiments, the drive pipe 2 is sloped to maximize the acceleration of the water 16 from gravity at the rate of 9.8 m/sec² and has sufficient length and diameter to provide sufficient water 16 to drive the two generators 8, 13 as approximately 30% of the water flow will be directed to the turbine 7 and approximately 70% of the water flow will be directed to rotation of a pitchback waterwheel 10.

The impulse valve 3 is normally open and allows the water 16 passing through the impulse valve 2 to flow vertically upwards. When the flow of water 16 reaches critical velocity, it creates pressure against this impulse valve 2 that forces it to close. This causes an immediate blockage to the kinetic energy and ceases the flow of water 16 down the drive pipe 2; thereby causing the kinetic energy from the flow of water 16 to be reversed and equally applied to all components along the entire fluidly coupled system. A far end of the drive pipe 2 is fluidly connected to the delivery valve 4 that is normally closed and is located at the bottom of the pressure vessel 5. The kinetic energy from the abrupt cessation of the water flow at the impulse valve 3 results in a positive and negative pressure wave to be set up in the water 16. The negative pressure component results in the brief opening of the delivery valve 4 and the injection of water 16 into the pressure vessel 5. This cycle repeats itself over and over with alternating opening and closing of the reciprocal valves 3, 4 and the injection of water 16 into the pressure vessel 5. Approximately 30% of the water 16 flowing down the drive pipe 2 is injected into the pressure vessel 5 so that over multiple cycles, this vessel 5 fills with water and the pressure within the vessel 5 increases as the bolus of air 31 within the vessel 5 is compressed. This increases the pressure on the water 16 within the vessel 5 to pressurize it so it can be routed to a delivery pipe 6 that pumps the water 16 to a higher elevation. Increased water pressure results in an increase in the revolutions per minute (rpm) of the turbine 7. The delivery pipe 6 water 16 is fluidly coupled to vanes 47 of the turbine 7 thereby inducing rotation of the vanes 47 of the turbine 7 which, in turn, induces rotation of a turbine shaft 29 connecting to a stator 49 within the first generator 8. As the rotors 48 are subsequently rotated within the magnetic field of the first generator 8, an electrical current is created and allowed to pass through a conductor to the grid, storage (i.e., battery), or be used in an electrical device. In the preferred embodiment, a Francis reaction turbine is used.

After the pressurized water 16 rotates the turbine 7, the water 16 exits at the bottom of the turbine housing 35 via a spent water pipe 62 that directs this flow of water 16 to the blades 25 of a pitchback waterwheel 10 that is operatively connected to a second generator 13. This flow of water 16 represents the turbine spent water flow that has lost most of its energy in the process of rotating the turbine 7. Gravity forces it to flow with reduced velocity to the pitchback waterwheel 10 through a downwardly angled pipe 62 from the turbine 7 to the pitchback waterwheel 10. As it flows, the spent water 16 undergoes gravitational acceleration before it is delivered to the upper portion of the pitchback waterwheel 10 where such water 16 represents the primary flow 9 of water 16 for the waterwheel 10.

A secondary flow 12 of water 16 for the pitchback waterwheel 10 comes from the approximately 70% of the water 16 flowing down the drive pipe 2 that is discharged at the impulse valve 3 as it operationally cycles through the hydram 46 operation. Though commonly referred to in hydram literature as "waste water", in this embodiment, the water 16 is not wasted. Rather, it contributes to the operation of the pitchback waterwheel 10 and the consequent generation of electricity from the attached second generator 13 and is designated as "hydram discharged water" 63.

The water 16 from the drive pipe 2 creates a velocity head due to gravitational acceleration of the water 16 from the entrance to the terminus at the impulse valve 3. This accelerated water 16 is discharged upward from the impulse valve 3 and is captured in a hydram discharge water pipe 64 portion of the drive pipe 2. The maximum vertical height of this discharge hydram water pipe 64 is determined by the velocity head from the drive pipe 2. During capture of the discharged water 16, the water 16 flows upwards into the hydram discharge water pipe 64 which has a vertical height at a higher elevation than its delivery point at the pitchback waterwheel 10. As it downwardly passes through this pipe 64, it undergoes gravitational acceleration. The water 16 from this discharge pipe 64 is delivered to the pitchback waterwheel 10 at the bottom of the waterwheel 10 to induce rotation of the wheel 10.

The pitchback waterwheel 10 of this embodiment comprises the housing 28, waterwheel shaft 27, second generator 13, primary and secondary water flows 9, 12, weir 24, Venturi valve 11, and a negative pressure to facilitate lift of the blades 25. The purpose of the pitchback waterwheel 10 is to use water 16 that was formerly wasted in other designs as efficiently as possible to produce electricity.

The pitchback wheel 10 of this embodiment of the active water hydroelectric system 18 comprises a plurality of curved blades 25. The waterwheel 10 is located within the housing 25 such that the secondary flow 12 from the discharge hydram water pipe 64 flows along the bottom of the wheel 10 to initiate rotation. This represents approximately 70% of the water 16 delivered from the drive pipe 2 to the hydram 46. In this embodiment of the active water hydroelectric system 18, there are four blades 26. However, a greater or lesser number of blades 25 may be used. The curvature of each blade 25 of one embodiment is such that the arc is greater at a distal end than an end closest to a waterwheel horizontal shaft 27.

Above the waterwheel the primary flow 9 from the turbine spent water pipe 62 enters the top of the housing 25. After entering the housing 25, the water 16 encounters the weir 24 positioned on the floor of the pipe 62 just before an opening on the floor of the pipe leading to the pitchback wheel. The weir 24 serves two purposes 1) to increase the velocity of the portion of the water 16 flowing to the pitchback waterwheel 10; and 2) to increase the pressure on the water 16 prior to a Venturi constriction 11. The Venturi constriction 11 is located just past the opening on the floor of the pipe 62 leading to the waterwheel 10 and it reduces the lumen of the pipe 62 such that the portion of the water 16 flow that does not pass to the waterwheel 10 passes through the constriction at increased pressure. The water forced through the Venturi valve 11 is increased in velocity and is dropped down a separate channel on the backside of the waterwheel 10. Along the backside channel wall one-third of the way vertically downward from the top of the waterwheel 11, an elevation is created on the housing wall proximal to the waterwheel 10 such that the elevation is closed at the top and open at the bottom to cause the water 16 to pass by the opening 14 but not to enter it. As the water 16 from the Venturi 11 passes downwardly over this elevation, it creates a negative pressure in the open end of the elevation. This negative pressure assists in the lift on the backside of the waterwheel 10 thereby facilitating the rotation of the waterwheel 10 via the Bernoulli Effect.

Approximately half of the water 10 from the turbine spent water pipe 62 is diverted down an opening in the floor of the pipe 62 directly to the waterwheel blades 25 located below. This water 16 strikes the front-side of the blades 25 of the waterwheel 10 between one-half and two-thirds of the distance from the center point of the wheel 10 to the free end and induces rotation of the blade 26 due to gravity, velocity, and mass of the water 16. The length of the pipes, downward slope, and associated frictional forces will determine the increased acceleration via gravity of the water as it passes to the pitchback wheel 10. The primary and secondary flows 9, 12 are merged below the waterwheel 10 to create a tertiary flow 15 that is discharged back to the original source 1 by downward angling the exit pipe 65 from the pitchback waterwheel 10 to return the water 16 to the source 1. Flow from the exit pipe 65 may be above or below the surface 40 of the water source 1. This water 16 is the sum of all the water 16 delivered from the water source 1 and forms a tail race to the associated river or stream abutting the dam. The pitch back wheel 10 may be fabricated from high tensile plastic to sustain the pressures developed during rotation and resist corrosion.

Accordingly, the three forces contributing to rotation of the waterwheel blades 25 result in rotation of the pitchback wheel 10 connected to the waterwheel horizontal shaft 27 that connects to the rotors 48 of the second generator 13. As the rotors 48 are rotated within the magnetic field created by the stators 49 of the second generator 13, an electrical current is induced that may be routed to the electrical grid, storage device, or used in an electrical device.

It is proposed that the full-scale version of the active water hydroelectric system 18 will be located near the base of a low-head dam (25 feet or less) and may allow several active water hydroelectric systems to be placed horizontally across the water flow from the dam to drive multiple systems 18 without occluding the entire width of the flow.

Passive Water System

Figure 5:
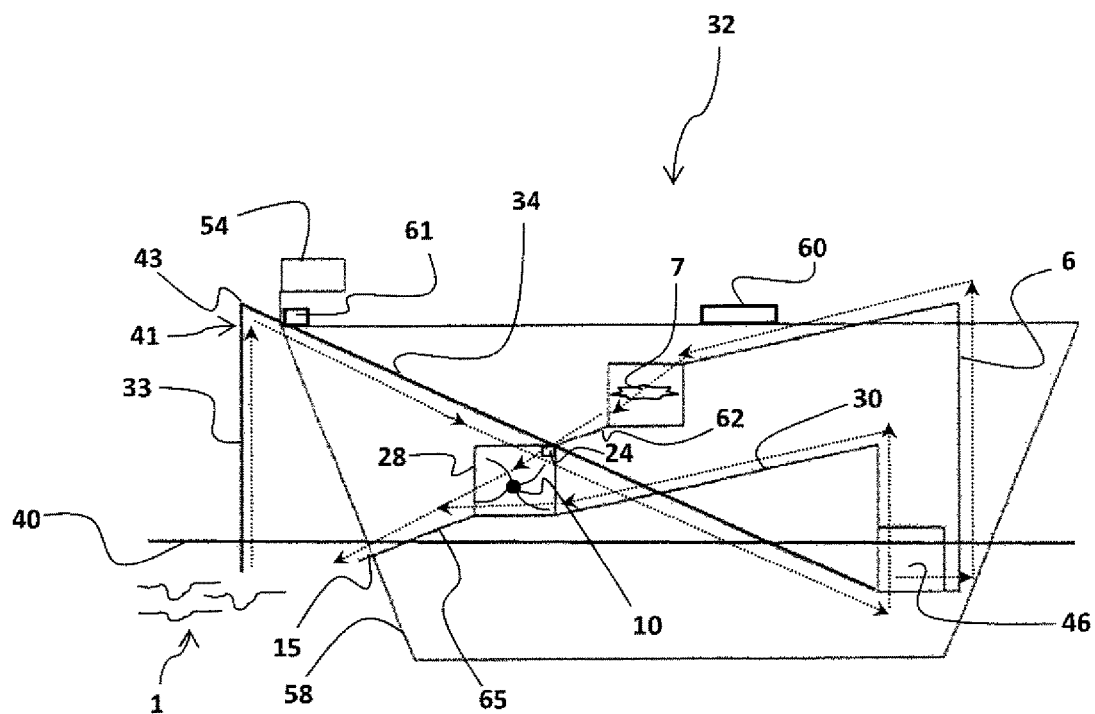
FIG. 5 is a conceptual schematic depiction of the passive hydroelectric system in accordance with another preferred embodiment.

Referring to FIG. 5, in the preferred embodiment the passive hydroelectric system 32, the system 32 generally comprises one or more vertical pipes 33, one or more vector pipes 34, one or more hydroelectric turbines 7, a turbine housing 36, a flotation support 37 and a drain siphon 44. The turbine housing 36 and vertical and vector pipes 33, 34 are directly or indirectly coupled to the flotation support 37 which may be a barge 58 or ship 58. The flotation support 37, in turn supports the flotation unit housing 35, which, directly or indirectly, houses all of the components of the system 32. In a preferred embodiment of the passive hydroelectric system 32, the flotation support 37 comprises a ringed configuration of flotation tubes 38 adapted to float within, or on a surface 40 of a water source 1. Attached to and arranged around a perimeter of the flotation support 37 are the vertical pipes 33. The vertical pipes 33 and vector pipes 34 are hollow tubular members. In a preferred embodiment, eight vertical pipes 33 are attached to eight respective vector pipes 33. However, a greater or lesser number of vertical pipes 33 and vector pipes 33 may be used. As the velocity head increases for each pipe 33 added to the turbine 7, the rotational speed of the turbine 7 increases as if the original vertical head 17 were greater.

The vertical pipes 33 of the preferred embodiment comprise an overall length of approximately 30 feet. The length can be greater or less than 30 feet but cannot exceed approximately 32 feet at sea level as this is the maximum height to which atmospheric pressure can lift water.

The water source 1, such as the surface of a lake or the ocean, is compressed by atmospheric pressure (e.g., 14.7 pounds per square inch at sea level). The flotation support 37 suspends the system 32 at the surface 40 of the water 1. An open lower end 39 of each vertical pipe 33 projects into the free water source 1 so that this lower end 39 is continuously below the surface 40 of the water source 1 and is, ideally, covered by a marine filter 55. The marine filter 55 helps prevents marine life from entering vertical pipe 33.

In this arrangement, a negative pressure is created within each vertical pipe 33 such that pressure inside each vertical pipe 33 is negative with respect to the water source 1 surface pressure such that the water 16 is pushed up the vertical pipe 33 by atmospheric pressure. An upper end 41 of each vertical pipe 33 may be hingedly coupled to an upper end 42 of each vector pipe 34 via a variable level connector/pivot mechanism 43. This variable level connector/pivot mechanism 43 facilitates maintaining the open lower end of the vertical pipe 39 in a suspended position below the surface 40 of the water source 1.

The water 16 within vertical pipe 33 reaches its maximum height in the vertical pipe 33 at the vertical pipe upper end 42 at which point the water 16 is directed into the vector pipe 34 via the variable level connector/pivot mechanism 43. In each vector pipe 34, the water 16 flows via gravity toward the turbine 7 positioned below a vector pipe opening 45 and accelerates to create a velocity head that peaks at the turbine 7 or, in some embodiments, a hydraulic ram 46. Each vector pipe opening 45 is lower than the open lower end 39 of each vertical pipe 33. In some embodiments, the turbine 7 is located below the surface 40 of the water source 1 and below the open lower end 39 of each vertical pipe 33. However, since the water is lifted by the hydram 60, the turbine 7 may be located above the surface 40 of the water source 1.

In embodiments comprising a hydraulic ram 46, the hydraulic ram 46 increases the pressure of the water 16 via a "hammer effect". This hammer effect forces the water 16 to flow with greater velocity through the delivery pipe 6. This amplified water pressure is delivered directly to the turbine 7 and its turbine vanes 47 to induce rotation of the vanes 47. A turbine shaft 29 at the center of the turbine's 7 vanes 47 transmits this rotational energy upwards to a rotor 48 that rotates through a magnetic field created by the stator 49 housed within the generator 8; thereby creating electricity. Such electricity can be stored in a battery or transmitted through a power line to, for example, the grid. In some embodiments, the system 32 comprises a conventional and commercially available solar array 60 which can generate electricity by processes and components well known in the art, the electricity being sufficient to operate a water pump 61. Other conventional devices may be used to generate electricity for use in operating the pump. This pump 61 may be used to lift the water 16 into the vertical pipe 33 or other parts of the system 32.

An upper structural support 50 binds all upper components together for stability regardless of the weather.

In some embodiments, once spent, the water 16 driving the turbine 7 drops to a spent water pipe 62 at the bottom of the turbine housing 36 where it is routed to top of the pitchback waterwheel 10. The primary and secondary flows 9, 12 are merged below the waterwheel 10 to create a tertiary flow 15 that is discharged back to the original source 1 by downward angling the exit pipe 66 from the pitchback waterwheel 10 to return the water 16 to the source 1. Flow from the exit pipe 65 may be above or below the surface 40 of the water source 1. In the event water 16 remains within the system conventional means of removing the water may be used such as a bilge pump 61 to remove such water 16 from various components/areas of the system 16.

The operation and use of the passive hydroelectric system 32 will now be discussed. Atmospheric pressure pushes down on the surface 40 of the water source 1 to create a constant pressure across the entire surface 40. The open lower end 39 of each vertical pipe 33 embedded sufficiently deep below the surface 40 of the water source 1 to be partially filled with water 16 to the level of the water surface 40. The vertical pipe 33 is connected via an airtight via a variable level connector/pivot mechanism 43 to the vector pipe 34 that is strategically directed downward toward the turbine 7 located at the center of the system 32. A flow initiator 54 located within the respective vertical and vector pipes 33, 34 creates a suction to remove air pressure from within the vertical and vector pipes 33,34 thereby reducing the pressure within pipes 33, 34 below ambient atmospheric pressure. This induces the water 16 compressed by atmospheric pressure to be pushed up the vertical pipes 33 to approximately 30 feet. At this level, the atmospheric pressure is generally not sufficient to push the water 16 higher. Therefore the elevated water 16 will succumb to gravity which is the stronger force at 30 feet and cause the water to fall down the vector pipe 34 toward the turbine 7. As the water 16 passes through the vector pipe 34 it accelerates in concert with gravitational energy and creates a velocity head. The turbine 7 is located near the lower end of the vector pipe 34.

Two alternative options exist at this point to induce rotation of the turbine from the kinetic energy of the water 16 flowing down the vector pipe 34. The first alternative is that the water 16 accelerated by the velocity head passes through the hydram pump 46. The hydram pump 46 causes the water 16 to be raised higher than the source water 1 surface 40 thereby amplifying the vertical head of the water 16 to a new height consistent with the kinetic energy in the vector pipe 34 and the induced pressure within the hydram pump 46 by the opening and closing of a delivery valve 4 and impulse valve 3 within the hydram pump 46. This causes the water 16 exiting the hydram pump 46 to be pumped higher than the original vertical head 17. Water that reaches the asymptote of the pumped vertical head creates a new source of velocity head when the pumping pressure reaches the top of delivery pipe 6. The water accelerates via gravity down the secondary vector pipe 67 but increased pressure from the hydram pump 46 has the effect of increasing the vertical head of original vertical pipe 33. Accordingly, the water flowing down the secondary vector pipe 67 reaches a higher velocity head due to the pressure equivalent of the pumped vertical height. This increased velocity head rotates the turbine 7 at more revolutions per minute (rpm) than would occur if the vertical head were just the height available from upper portion of the water source vertical pipe 33.

The deliver valve 4 and impulse valve 3 in the hydraulic ram serve as types of logic gates as they alternately open and close the flow of water to trigger the hammer effect.

It is desirable that the various components of the various embodiments of this invention be constructed of materials that resist corrosion of water and sea water. Such materials may include polyvinyl chloride (pvc) and chromium steel alloys such as used in off-shore petroleum systems to provide the most cost effective materials. Each system 18, 32 requires the application of the laws of physics to insure that velocity heads developed are sufficient to drive the turbine 7 and pitch back wheel 10 required to produce a given amount of electrical power. The systems 18, 32 may be scaled to the desired amount of power and the amount of water available. It is possible to use a combination of both a hydraulic ram 46 and multiple pipes 33, 34, 56, 57 in the same system connected in series to increase the power of the velocity head to the turbine.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "In" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

The foregoing disclosure and showings made in the drawing are merely illustrative of the principles of this invention and are not to be interpreted in a limiting sense. While the invention is shown in only a few forms, it is not just limited to the forms shown, but is susceptible to various changes and modifications without departing from the spirit thereof. The foregoing description of a preferred embodiment of the invention has been presented for the purpose of illustration and description. It is not intended to be exhaustive or to limit the invention to the precise form disclosed. Obvious modifications or variations are possible in light of the above teachings. The invention may be adapted for use in a number of environments.

The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention in accordance with the breadth of this disclosure and the claims, to which it is fairly, legally, and equitably entitled to be interpreted.

I claim:

1. A hydrodynamic turbine system for use, in combination, with a passive water source, the system comprising:
    one or more vertical pipes, one or more vector pipes, a flotation support; a delivery pipe, a solar array, a flow initiator, a pump, a hydraulic ram, a turbine, a water wheel, and a tertiary pipe;
    the one or more vertical pipes, one or more vector pipes, delivery pipe, flow initiator, pump, hydraulic ram, turbine, water wheel, and tertiary pipe being directly or indirectly mounted on the flotation support such that the flotation support supports the system;
    the flow initiator and pump being operatively connected to the solar array and at least one of the one or more vertical pipes;
    the one or more vertical pipes being fluidly connected to respective vector pipes, said vertical and vector pipes being structured and arranged to convey water from the water source to the hydraulic ram;
    the hydraulic ram being fluidly connected to the delivery pipe and the tertiary pipe, the delivery pipe rising from the hydraulic ram to a level above the turbine, the tertiary pipe being fluidly connected to an exit pipe, the exit pipe being the avenue of egress of water from the system;
    wherein, the hydraulic ram causes water to move upward into the delivery pipe forming a primary flow of water;
    wherein, the hydraulic ram causes water to enter the tertiary pipe forming a tertiary flow of water; and
    the turbine being structured and arranged to turn upon movement of the primary flow of water and generate electricity.

2. The hydrodynamic turbine system of claim 1 further comprising:
    a waterwheel comprising blades;
    the waterwheel being operatively connected to a generator such that turning of the waterwheel generates electricity; and
    the waterwheel being structured and arranged to turn upon movement of the tertiary flow of water.

3. The hydrodynamic turbine system of claim 2 wherein:
    a spent water pipe is fluidly connected to the turbine; and
    the primary flow of water falls from the spent water pipe to the waterwheel causing the water wheel to turn.

4. The hydrodynamic turbine system of claim 3 wherein a water wheel housing comprises a weir, the weir being structured and arranged to regulate the flow of water through the water wheel housing such that water exiting the turbine takes one of two paths;

the first path being against and through the weir that accelerates flow of water and bypasses the water wheel with forward flow;

the second path being downward flow around the weir and through the water wheel;

the first and second paths merging downstream of the water wheel, wherein the first path creates low pressure downstream of the water wheel.

5. The hydrodynamic turbine system of claim 4 wherein movement of water along the second path causes the waterwheel to turn.

\* \* \* \* \*